(12) United States Patent
Chen et al.

(10) Patent No.: US 12,433,301 B2
(45) Date of Patent: Oct. 7, 2025

(54) INFANT FORMULA MILK POWDER RICH IN MILK FAT GLOBULE MEMBRANE PROTEIN, PHOSPHOLIPIDS AND OLIGOSACCHARIDES AND PREPARATION METHOD THEREFOR

(71) Applicant: Beijing Sanyuan Foods Co., Ltd., Beijing (CN)

(72) Inventors: Lijun Chen, Beijing (CN); Jingyao Chen, Beijing (CN); Junying Zhao, Beijing (CN); Yan Liu, Beijing (CN); Qian Liu, Beijing (CN); Bin Liu, Beijing (CN); Weicang Qiao, Beijing (CN)

(73) Assignee: BEIJING SANYUAN FOODS CO., LTD., Beijing (CN)

( * ) Notice: Subject to any disclaimer, the term of this patent is extended or adjusted under 35 U.S.C. 154(b) by 382 days.

(21) Appl. No.: 18/172,992

(22) Filed: Feb. 22, 2023

(65) Prior Publication Data
US 2023/0263179 A1    Aug. 24, 2023

Related U.S. Application Data

(63) Continuation of application No. PCT/CN2021/113937, filed on Aug. 23, 2021.

(30) Foreign Application Priority Data

Sep. 9, 2020   (CN) .......................... 202010940024.0

(51) Int. Cl.
| | | |
|---|---|---|
| A61K 35/20 | (2006.01) |
| A23B 11/12 | (2025.01) |
| A23C 9/152 | (2006.01) |
| A23C 9/16 | (2006.01) |
| A61K 31/231 | (2006.01) |
| A61K 31/232 | (2006.01) |
| A61K 31/683 | (2006.01) |
| A61K 31/685 | (2006.01) |
| A61K 31/688 | (2006.01) |
| A61K 31/7008 | (2006.01) |
| A61K 31/702 | (2006.01) |
| A61K 31/7028 | (2006.01) |
| A61K 31/715 | (2006.01) |
| A61K 38/17 | (2006.01) |
| A61K 38/38 | (2006.01) |
| A61K 38/40 | (2006.01) |
| A61P 1/14 | (2006.01) |

(52) U.S. Cl.
CPC ............ *A23C 9/1526* (2013.01); *A23B 11/12* (2025.01); *A23C 9/1528* (2013.01); *A23C 9/16* (2013.01); *A61K 31/231* (2013.01); *A61K 31/232* (2013.01); *A61K 31/683* (2013.01); *A61K 31/685* (2013.01); *A61K 31/688* (2013.01); *A61K 31/7008* (2013.01); *A61K 31/702* (2013.01); *A61K 31/7028* (2013.01); *A61K 31/715* (2013.01); *A61K 35/20* (2013.01); *A61K 38/1709* (2013.01); *A61K 38/1735* (2013.01); *A61K 38/38* (2013.01); *A61K 38/40* (2013.01); *A61P 1/14* (2018.01)

(58) Field of Classification Search
CPC ........................... A61K 38/40; A61K 38/1735
See application file for complete search history.

(56) References Cited

U.S. PATENT DOCUMENTS

| | | |
|---|---|---|
| 2016/0158287 A1 | 6/2016 | Lönnerdal et al. |
| 2017/0000182 A1 | 1/2017 | Huber-Haag et al. |
| 2018/0133287 A1 | 5/2018 | Morelli et al. |
| 2018/0160714 A1 | 6/2018 | Schoemaker et al. |

FOREIGN PATENT DOCUMENTS

| | | |
|---|---|---|
| CN | 102524422 A | 7/2012 |
| CN | 105744845 A | 7/2016 |
| CN | 106359604 A | 2/2017 |

(Continued)

OTHER PUBLICATIONS

Examination Report issued in Australian Patent Application No. 2021340764; mailed Aug. 1, 2022; 9 pgs.

(Continued)

*Primary Examiner* — Qiuwen Mi

(74) *Attorney, Agent, or Firm* — HAUPTMAN HAM, LLP

(57) ABSTRACT

An infant formula milk powder is rich in milk fat globule membrane protein, phospholipids, and oligosaccharides. A preparation method includes using raw cow milk as raw material, cleaning and pre-sterilizing raw cow milk, adding MFGM-rich whey protein powder, α-lactalbumin powder, galactooligosaccharides, polyfructoses and other ingredients into the pre-sterilized raw cow milk, and performing pre-sterilization, homogenization, sterilization, concentration, and spray drying. By means of formula adjustment, the contents of biologically active substances having special functional components such as MFGM-protein, lactoferrin, α-lactalbumin, total galactooligosaccharide, total polyfructose, sialic acid, total phospholipid, sphingomyelin, lecithin, phosphatidylserine, phosphatidylethanolamines, phosphatidylinositol, ganglioside, triglyceride and diglyceride in the infant formula milk powder are increased, thereby facilitating the colonization of probiotics in the intestinal microbiota of an infant, especially significantly enriching lactic acid bacteria in an intestinal tract, while reducing unclassified bacterial family and other miscellaneous bacteria.

8 Claims, 7 Drawing Sheets

(56) References Cited

FOREIGN PATENT DOCUMENTS

| | | |
|---|---|---|
| CN | 106912614 A | 7/2017 |
| CN | 108294112 A | 7/2018 |
| CN | 112042750 A | 12/2020 |
| WO | 2019215289 A1 | 11/2019 |

OTHER PUBLICATIONS

First Office Action issued in Chinese Patent Application No. 202010940024.0; mailed Dec. 15, 2021; 18gs.
International Search Report issued in International Application No. PCT/CN2021/113937; mailed Nov. 17, 2021; 6 pgs.

INFANT FORMULA MILK POWDER RICH IN MILK FAT GLOBULE MEMBRANE PROTEIN, PHOSPHOLIPIDS AND OLIGOSACCHARIDES AND PREPARATION METHOD THEREFOR

CROSS REFERENCE

This disclosure is a Continuation of International Application No. PCT/CN2021/113937 filed on Aug. 23, 2021, which claims the priority of an invention Chinese patent application No. 202010940024.0 filed on Sep. 9, 2020, and the invention, titled "INFANT FORMULA MILK POWDER RICH IN MILK FAT GLOBULE MEMBRANE PROTEIN, PHOSPHOLIPIDS AND OLIGOSACCHARIDES AND PREPARATION METHOD THEREOF", which are incorporated by reference herein in their entireties.

TECHNICAL FIELD

This disclosure relates to the field of food engineering, and in particular to an infant formula milk powder rich in milk fat globule membrane protein, phospholipids and oligosaccharides and a preparation method therefor.

BACKGROUND

The structure and function of the gastrointestinal tract of an infant rapidly adapts to the transition from parenteral nutrition (placenta) to enteral nutrition (colostrum/milk powder) after delivery, which is accompanied by dynamic microbial colonization. The initial establishment of the intestinal tract microbiota during infancy is involved in the multiple interactions of intestinal tract development, metabolic homeostasis, and immune defense, laying a critical foundation for long-term health later in life. Thus, neonatal intestinal tract development and microbial colonization represent a window of opportunity for lifelong health. Because the intestinal tract microbiome after birth is highly adaptable and susceptible to nutrient intake and the surrounding environment during infancy, a superior integrity and functional intestinal tract is required for healthy host growth. In addition, the colonizing microbiota is involved in nutrient metabolism, and the metabolites thereof also contribute to the integrity of the intestinal tract barrier. Thus, early bacterial optimal colonization affects barrier function and plays a critical role in intestinal tract development and neonatal growth.

Human milk is the most ideal natural food for infants, and it is known that there are more than 2,000 components in human milk. Human milk proteins may also be divided into three groups: mucins, casein and whey. Mucin, also known as milk fat globule membrane protein (MFGM), is a lipid-protein complex that encapsulates milk fat globules and has beneficial effects on intestinal digestion, physiology and regulation of microbial populations. It is reported that it may accelerate the growth and development of infants and piglets. The lipids of the milk fat globule membrane are mainly composed of neutral and polar lipids, and a small amount of glycolipids. Phospholipids are polar lipids and the main component of lipids, which can promote the absorption and transport of fat digestion products in the digestive tract. In addition, phospholipids are also involved in immune regulation, nerve signal transduction and the like. The main phospholipids present in human milk fat globules include sphingomyelin (SM), lecithin (PC), phosphatidylserine (PS), phosphatidylethanolamine (PE) and phosphatidylinositol (PI). Neutral lipids of milk fat globule membranes include for example triglycerides (TAG), diglycerides (DAG), cholesterol and their lipids.

Galactooligosaccharides (GOS) and polyfructose (FOS) are prebiotics selectively utilized by host microorganisms, conferring their role in health. Studies of GOS and FOS showed a preference for colonization by beneficial bacteria, such as *lactobacillus*, which have similar effects on the metabolic activity of the microbiota as breast milk oligosaccharides. GOS and FOS also have good applications in intestinal development and immune response. GOS and FOS are prebiotics that are fermented by intestinal flora to produce short chain fatty acids (SCFAs), which have beneficial effects on development and growth of intestinal tract. In addition, milk-derived milk fat globule membrane (MFGM) exhibits trophic bioactivity in metabolic regulation and intestinal homeostasis. MFGM may also alter the composition of intestinal flora and enhance intestinal barrier function. However, development of intestinal tract and microbial colonization in infancy are key steps in the growth phase. Most of the previous studies on MFGM research and application focused on separation, identification of components, and verification of functional properties thereof through metabolomics, but the effects on microbial colonization of infant intentional tract, development of intentional tract microecosystem, and barrier integrity are still unclear.

A mixed intervention of GOS and MFGM was reported to improve neurodevelopment in piglets. However, the combined effects of GOS, MFGM, and FOS on microbial composition and development of intestinal tract remain unclear.

SUMMARY OF THE INVENTION

In order to solve the problems of the prior art, the purpose of this disclosure is intended to provide an infant formula milk powder rich in milk fat globule membrane protein, phospholipids and oligosaccharides. The milk powder is prepared from raw cow milk as a raw material, added with MFGM-rich whey protein powder, α-lactalbumin powder, galactooligosaccharides and polyfructoses, by means of formula adjustment, the contents of biologically active substances with special functional ingredients such as MFGM-protein, lactoferrin (LF), α-lactalbumin (α-La), total galactooligosaccharides (GOS), total polyfructoses (FOS), sialic acid, total phospholipids, sphingomyelin (SM), lecithin (PC), phosphatidylserine (PS), phosphatidylethanolamine (PE) and phosphatidylinositol (PI), ganglioside (Gang), triglyceride (TAG), diglyceride (DAG) are increased, to promote the colonization of probiotics in the intestinal flora of infants, especially to significantly enrich the lactic acid bacteria in the intestinal tract, while reducing the unclassified bacteria and other miscellaneous bacteria, thereby increasing the content of immune factors in the intestinal tract and reducing the incidence of intestinal diseases. The formula is suitable for the development of formula for infants and older infants.

This disclosure is achieved through the following technical solutions:

This disclosure provides an infant formula milk powder rich in milk fat globule membrane protein, phospholipids and oligosaccharides, prepared by using raw cow milk as raw material, added with MFGM-rich whey protein powder, α-lactalbumin powder, galactooligosaccharides and polyfructoses; wherein contents of functional active ingredients per 100 grams of the infant formula milk powder are: 0.146-0.438 g total MFGM-protein, 0.22-0.35 g total α-lactalbumin, 0.2-0.6 g total lactoferrin, 0.1-0.3 g immunoglobulin IgG, 0.025-0.075 g lactadherin, 0.035-0.105 g MUC1/Mucin1, 0.015-0.4 g total galactooligosaccharide, 0.001-0.003 g total polyfructose, 0.05-0.15 g sialic acid, 0.175-0.525 g total phospholipid, 0.04-0.12 g sphingomyelin, 0.005-0.015 g ganglioside, 0.06-0.19 g lecithin, 0.04-0.14 g phosphatidylethanolamine, 0.02-0.06 g phosphatidylinositol, 0.007-0.021 g phosphatidylserine, 0.0174-0.0371 g diglyceride, and 0.0311-0.0598 g triglyceride. See Table 1.

TABLE 1

Contents of functional active ingredients in infant formula milk powder that can promote health of intestinal tract

| Functional Active Ingredients | Unit | Per 100 g | Per 100 kj |
|---|---|---|---|
| Total MFGM-protein | g | 0.146-0.438 | 0.00676-0.0203 |
| Total α-lactalbumin | g | 0.22-0.35 | 0.00324-0.00436 |
| Total lactoferrin | g | 0.2-0.6 | 0.000926-0.00278 |
| Immunoglobulin IgG | g | 0.1-0.3 | 0.00463-0.0139 |
| Lactadherin | g | 0.025-0.075 | 0.00116-0.00347 |
| MUC1/Mucin1 | g | 0.035-0.105 | 0.00162-0.00486 |
| Total galactooligosaccharide | g | 0.015-0.4 | 0.00255-0.0068 |
| Total polyfructose | g | 0.001-0.003 | 0.0017-0.0051 |
| Sialic acid | g | 0.05-0.15 | 0.00231-0.00694 |
| Total phospholipid | g | 0.175-0.525 | 0.0081-0.0243 |
| Sphingomyelin | g | 0.04-0.12 | 0.00186-0.00556 |
| Sphingomyelin | g | 0.005-0.015 | 0.000231-0.000694 |
| Lecithin | g | 0.06-0.19 | 0.00291-0.00874 |
| Phosphatidylethanolamine | g | 0.04-0.14 | 0.00079-0.00314 |
| Phosphatidylinositol | g | 0.02-0.06 | 0.000086-0.00037 |
| Phosphatidylserine | g | 0.007-0.021 | 0.0000034-0.000013 |
| Diglyceride | g | 0.0174-0.0371 | 0.0115-0.0221 |
| Triglyceride | g | 0.0311-0.0598 | 0.006-0.014 |

In the foregoing infant formula milk powder, based on 1 ton of infant formula milk powder, the addition amount of the MFGM-rich whey protein powder is 25 kg-75 kg, the addition amount of the α-lactalbumin powder is 8 kg-75 kg, the addition amount of the galactooligosaccharide is 44 kg-133 kg and the addition amount of the polyfructose is 1.8 kg-5.5 kg; and a bovine colostrum is added, which the bovine colostrum is made into 15-16 kg of bovine colostrum powder from 100 L fresh milk. The formula milk powder for infants and young children added and prepared according to the above ratio has a higher total active ingredient of α-lactalbumin.

Further preferably, based on 1 ton of infant formula milk powder, the addition amount of the MFGM-rich whey protein powder is 55 kg-65 kg, the addition amount of the α-lactalbumin powder is 8 kg-15 kg, the addition amount of the galactooligosaccharide is 97 kg-115 kg and the addition amount of the polyfructose is 4 kg-5 kg.

The bovine milk α-lactalbumin has only 76% amino acid sequence identity with human milk α-lactalbumin. The α-lactalbumin has very high nutritional value for infants, and its amino acid composition is very similar to amino acid requirements and amino acid patterns for infants. α-lactalbumin has been shown to be a part of lactose synthase and is involved in the synthesis of lactose in the mammary gland. Lactose synthase consists of two proteins, α-lactalbumin and galactosyltransferase, which together catalyze the binding of glucose to UDP-galactose. When α-lactalbumin is digested in the intestinal tract of infants, the peptides produced have antibacterial and immune-enhancing effects. It is recently discovered that α-lactalbumin multimers also have anti-infection and apoptosis-promoting effects, which are important for the intestinal health of infants. The formula of the present application is specially filled with α-lactalbumin to synergistically improve the intestinal health of infants.

Other ingredients such as fats, lactose, minerals, vitamins and some optional nutrients (choline, inositol, taurine, carnitine, etc.) may also be incorporated into the foregoing infant formula of the present disclosure. The resulting infant formula milk powder has the effect of promoting the intestinal health of infants.

The present disclosure provides a method for preparing infant formula milk powder rich in milk fat globule membrane protein, phospholipid and oligosaccharide, including the steps: using raw cow milk as raw material, cleaning and pre-sterilizing raw cow milk (85° C.-88° C., 30 s), adding MFGM-rich whey protein powder, α-lactalbumin powder, galactooligosaccharides, polyfructoses and other ingredients into the pre-sterilized raw cow milk, and performing pre-sterilization (85° C.-88° C., 30 s), homogenization at 15 mPa, sterilization (93° C.-95° C., 15 s), concentration, and spray drying (inlet air temperature 150° C.-160° C., and outlet air temperature 85° C.-90° C.).

The testing of the nutritional indicators, physical and chemical indicators, microbial indicators and sensory indicators of the products described in this disclosure is carried out in strict accordance with the testing items and testing methods specified in the National Standards on Food Safety of P. R. China (GB-10765-2010).

Another specific embodiment of the present disclosure relates to the use of high-throughput sequencing technology to sequence and analyze the 16S rDNA genes in piglet feces, and to investigate the influence of the formula milk powder of the present disclosure on growth and intestinal flora composition.

Beneficial Effects

The formula milk powder capable of promoting the intestinal health of infants developed in this disclosure increases the contents of various functional active ingredients such as total MFGM-protein, galactooligosaccharides, polyfructose, lactoferrin, α-lactalbumin, IgG, lactadherin, MUC1/Mucin1, phospholipids, gangliosides, sphingomyelin and sialic acid by adding MFGM-rich whey protein powder, α-lactalbumin, galactooligosaccharides and polyfructose, making it as close as possible to breast milk. After birth, intestinal tracts of mammals must have morphology and functions adapted to the transition from a sterile uterus to a bacteria-rich environment. As such, the neonatal period is a critical window for microbial colonization. The piglet model experiments showed that oral administration of the formula of the application can improve the growth performance of piglets and reduce the level of plasma IgG, activate the colonization of probiotics in the intestinal tract of piglets, and significantly enrich the lactic acid bacteria in the intestinal tract, while reducing the unclassified bacteria and other miscellaneous bacteria. The intestinal barrier function was enhanced by increasing the expression of genes tight junctions (Occludin and ZO-1), mucins (Mucin-2 and Mucin 4) and cytokines (IL-1β and IL-22) by increasing gene expressions, thereby enhancing intestinal barrier function, and improving growth performance of newborn piglets. Our findings suggest that GOS, MFGM and FOS play a very important role in regulating the early intestinal microbiome of infants, which is suitable for the development of formula powders for infant and older infants.

BRIEF DESCRIPTION OF THE DRAWINGS

wherein panel FIG. 1A shows diversity (Sobs index); panel FIG. 1B shows Shannon index; panel FIG. 1C shows β-diversity of PCoA based on unweighted Unifrac distance; panel FIG. 1D shows differential microbial composition based on Wilconxon rank sum test; and panel FIG. 1E shows genus-level Linear Sex Analysis Effect Size (LefSe) analysis, Linear Discriminant Analysis (LDA) score >4; *P<0.05; **P<0.01.

wherein panel FIG. 2A shows diversity (Sobs index); panel FIG. 2B shows Shannon index; panel FIG. 2C shows β-diversity of PCoA based on unweighted Unifrac distance; panel FIG. 2D shows differential microbial composition based on Wilconxon rank sum test; and panel FIG. 2E shows genus-level Linear Sex Analysis Effect Size (LefSe) analysis, Linear Discriminant Analysis (LDA) score >4; *P<0.05; **P<0.01.

wherein panel FIG. 3A is the differential abundance of Kyoto Encyclopedia of Genes and Genomes (KEGG) on the eighth day; and panel FIG. 3B is the differential abundance of Kyoto Encyclopedia of Genes and Genomes (KEGG) on the twenty-first day.

Figure 4A:
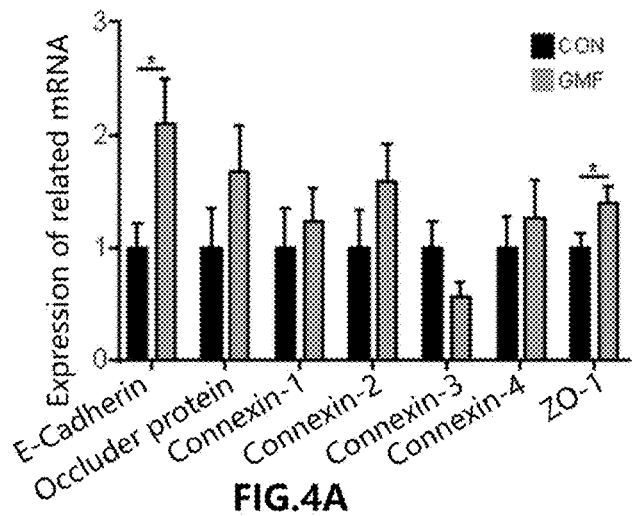
FIGS. 4A-4G show the influence of expression of intestinal barrier-related genes and intestinal permeability of the twenty-first day newborn piglets in Example 1 of the present disclosure.
Figure 4B:
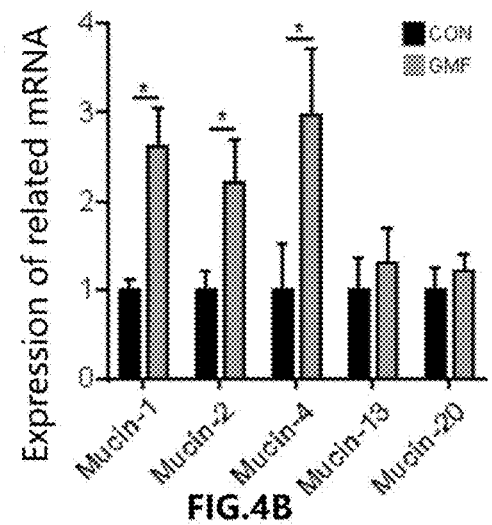
Figure 4C:
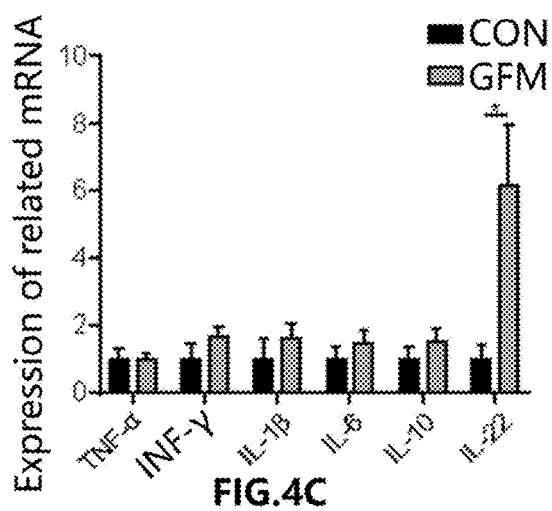
Figure 4D:
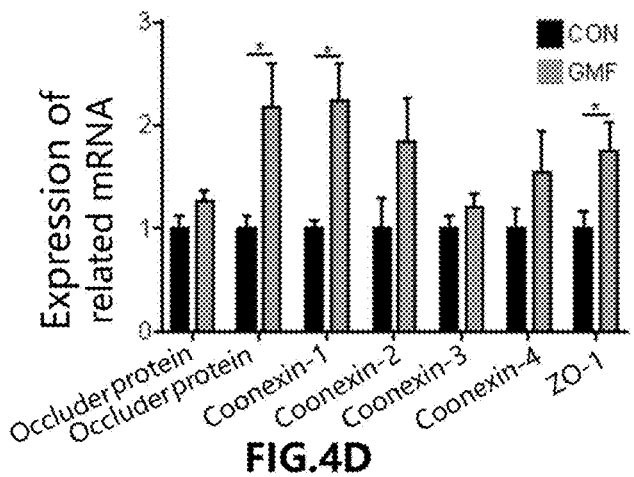
Figure 4E:
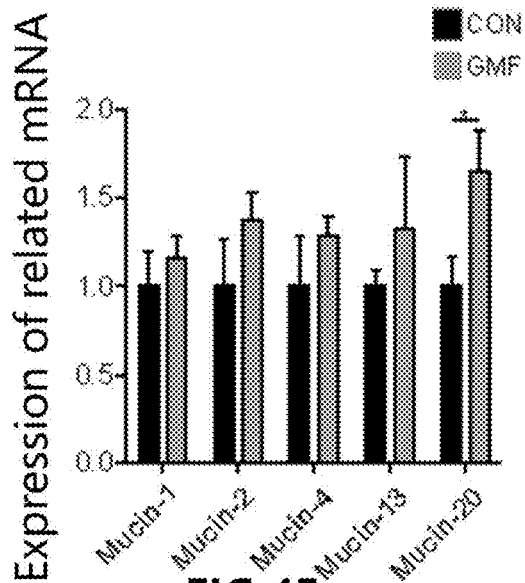
Figure 4F:
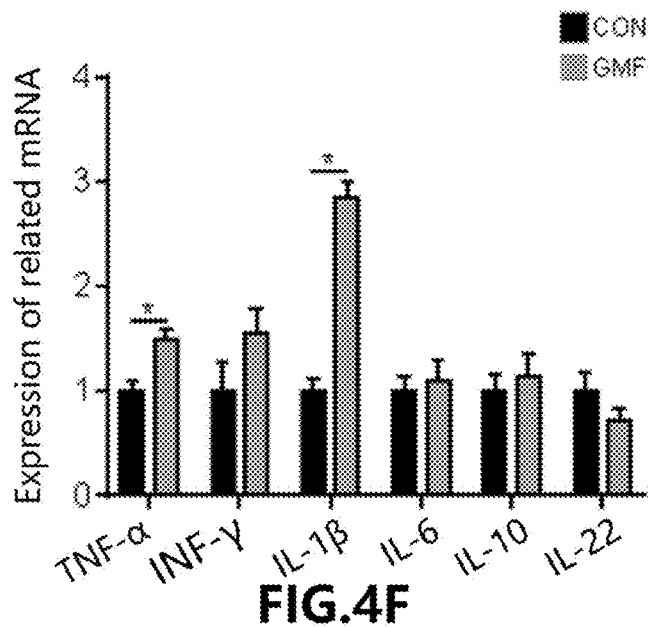
Figure 4G:
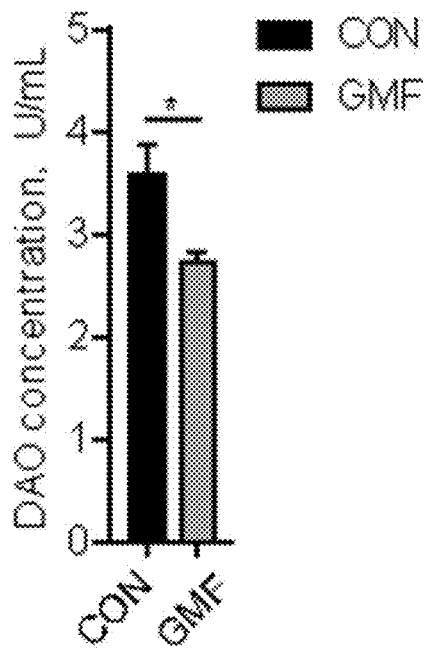

Expression of intestinal barrier-related genes in ileal mucosa (FIGS. 4A-4C) and colonic mucosa (FIGS. 4D-4F); and expression of plasma DAO levels (FIG. 4G).

Figure 5A:
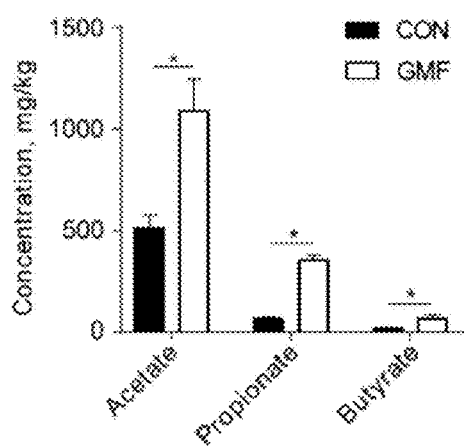
Figure 5B:
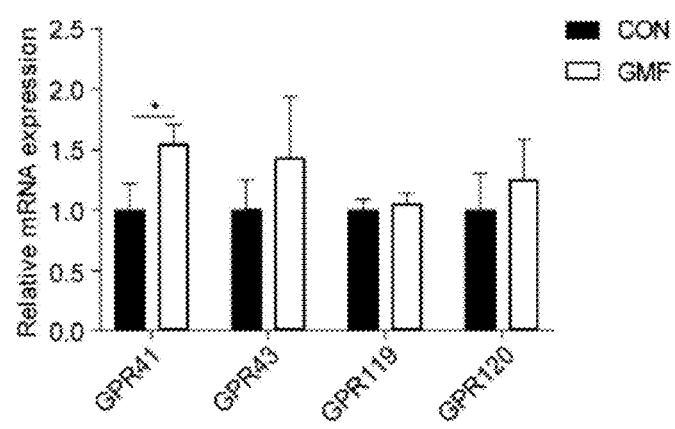

FIGS. 5A and 5B show the effect of piglet fecal SCFAs concentration and intestinal GPRs gene of Example 1 of the present disclosure:

wherein panel A shows the difference in the concentration of short-chain fatty acids in piglet feces, and panel B shows the expression of receptor genes.

Figure 6:
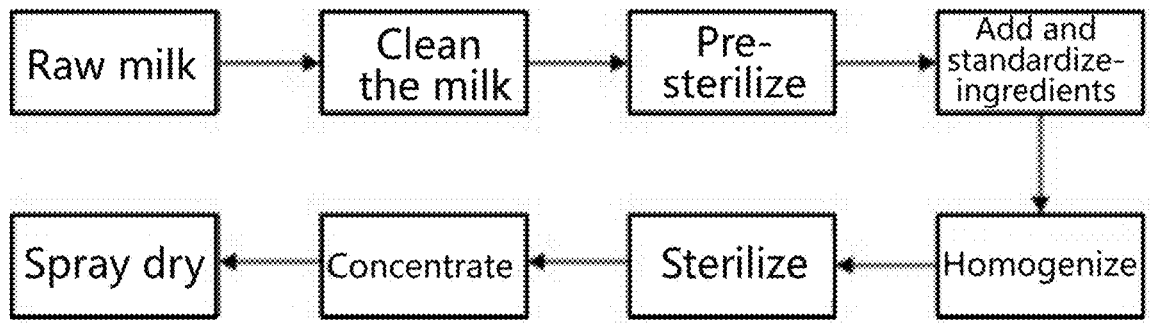

FIG. 6 shows a production flow chart of the present disclosure of Example 1 of the present disclosure.

DETAILED DESCRIPTION OF THE INVENTION

In order to make the objectives, technical solutions, and advantages of this disclosure clearer, the technical solutions of this disclosure will be described clearly and completely below by reference to the drawings. It is apparent that the described embodiments are part of the embodiments of this disclosure, but not exhaustive. Based on embodiments of this disclosure, all other embodiments obtained by those of ordinary skill in the art without creative work shall fall within the protection scope of this disclosure. Unless otherwise expressly stated, throughout the specification and claims, the term "comprising" or a variation thereof such as "including" or "contain" is construed as including the stated element or component, without excluding other elements or other components.

Examples 1: Comparison of Active Ingredients in the Infant Formula Milk Powder and Breast Milk and Comparative Examples. Refer to Table 2.

Comparative Example: CN106359604A

TABLE 2

| Functional Ingredients | Active Unit | This disclosure Per 100 g | Comparative Example Per 100 g | Breast Milk Per 100 g |
|---|---|---|---|---|
| Total MFGM-protein | g | 0.438 | 0.251 | 0.1 |
| Total α-lactalbumin | g | 0.35 | | 2-3 |
| Total lactoferrin | g | 0.35 | 0.0344 | 1-2 |
| Immunoglobulin IgG | g | 0.172 | 0.172 | 0.7-2 |
| Lactadherin | g | 0.075 | 0.043 | 0.093 |
| MUC1/Mucin1 | g | 0.105 | 0.0602 | 0.73 |
| Total galactooligosaccharide | g | 0.4 | 0.89 | 2.21 |
| Total polyfructose | g | 0.003 | 0.1 | |
| Sialic acid | g | 0.15 | 0.171 | 0.39 |
| Total phospholipid | g | 0.525 | 0.301 | 1.71 |
| Sphingomyelin | g | 0.12 | 0.0688 | 0.675 |
| Sphingomyelin | g | 0.015 | 0.0086 | 0.003 |
| Lecithin | g | 0.19 | | 0.324 |
| Phosphatidylethanolamine | g | 0.14 | | 0.576 |
| Phosphatidylinositol | g | 0.06 | | 0.0489 |
| Phosphatidylserine | g | 0.021 | | 0.08 |
| Diglyceride | g | 0.0371 | | 3.183629 |
| Triglyceride | g | 0.0598 | | 386.5839 |

It may be seen from the above comparison that the active ingredients of the formula milk powder of the present disclosure are more comprehensively close to breast milk. Particularly, the ingredients such as total α-lactalbumin, lecithin, phosphatidylethanolamine, phosphatidylinositol, phosphatidylserine, diglyceride, triglyceride are not present in CN106359604A. The amount of total lactoferrin was nearly 10 times higher than that in the comparative example, indicating reduced gap from breast milk.

The active ingredients in Table 2 were prepared according to the following method through wet processing process, as shown in FIG. 6. The raw cow milk, used as raw material, was cleaned and pre-sterilized. After that, 60 kg MFGM whey protein powder, 10 kg α-lactalbumin powder, 106 kg galactooligosaccharides, and 4.33 kg polyfructoses were added to 2000 L of the pre-sterilized raw milk, which was then homogenized, sterilized, concentrated and dried.

The above method were conducted at the following main process parameters: the pre-sterilization (85° C.-88° C., 30 s); homogenization 15 mPa; sterilization (93° C.-95° C., 15 s); spray drying (inlet air temperature 150° C.-160° C., and outlet air temperature 85° C.-90° C.).

The testing of the nutritional indicators, physical and chemical indicators, microbial indicators and sensory indicators of the products described in this disclosure is carried out in strict accordance with the testing items and testing methods specified in the National Standards on Food Safety of P. R. China (GB-10765-2010).

Example 2: Evaluation of the Influence of the Product on Intestinal Microecology Based on the Piglet Model 1. Test Method
1.1 Establishment of Piglet-Based Model and Sampling 16 piglets (1.53±0.04 kg) from different litters (one piglet per litter) were randomly assigned to the control group fed normal saline (referred to as CON group) and the experimental group, which were fed galactooligosaccharides, MFGM whey protein powder, α-lactalbumin powder, galactooligosaccharides, polyfructose (abbreviated as GMF group, Example 1 of this disclosure). From the first day to the seventh day after birth, the piglets in the GMF group were administered 5 mL GMF solution (1 g/kg body weight) every day, and the piglets in the CON group were fed the same amount of normal saline. The piglets consumed sow milk and water normally throughout the lactation period. Commercial feed was added from the eighth day postpartum. Health status was monitored daily, and body weights were recorded on day 21. On day 21, 5 piglets (approximately the average weight per group) were selected, and piglet blood samples were taken from the jugular vein. Plasma was collected after centrifugation at 3000 g for 10 min at 4° C. Then, feces were collected and quick-frozen in liquid nitrogen for analysis of microbial composition. After the piglets were euthanized, duodenum, jejunum, and ileum specimens were fixed in 10% phosphate-buffered formalin for morphological evaluation. The mucous membranes of the midcolumns and midcolumns were rapidly obtained and frozen in liquid nitrogen for gene expression characterization. All samples were stored at −80° C. until further analysis.

1.2 Establishment of Piglet-Based Model and Sample Detection 1.2.1 Piglet Plasma Sample Testing The contents of diamine oxidase (DAO) and immunoglobulins (including IgA, IgG and IgM) in piglet plasma were determined by ELISA.

1.2.2 Detection of Piglet Intestinal Microecology

Intestinal samples were removed from 10% phosphate-buffered formalin, dehydrated through graded ethanol series (70%-100%), then cleared with xylene, and embedded in paraffin Serial sections (5 μm thick) were taken. By using an imaging microscope, at least 15 intact and well-oriented villi and the associated crypt magnification for each fragment were measured. Villus height was measured from the villus tip to the villus-crypt junction, and crypt depth was defined as the invagination depth between adjacent villi.

1.2.3 High-Throughput 16S rRNA Sequencing for Piglet Faces

The V3-V4 region of the 16S rRNA gene was amplified with primers and purified with Axy PrepDNA gel extraction kit. Then, the purified PCR products were pooled in equimolar amounts and sequenced on the platform.

1.2.4 Determination of Short Chain Fatty Acids in Piglet Feces

Quantitative analysis was performed for short-chain fatty acids including acetate, propionate, and butyrate in piglet fecal samples by ion chromatography.

2. Results 2.1 Effects of GMF on Growth and Development of Piglets 2.1.1 Effect of GMF on Piglet Body Weight As shown in Table 3, body weight of the piglets in the GMF group significantly increased on day 8 and day 14 (P<0.05) compared with the piglets in the CON group. In addition, the average daily gain on days 1-8, 1-21 and the whole period (day 1-21) in the GMF group were significantly increased (P<0.05).

TABLE 3

Effect of MFGM and LF on piglet body weight

| | CON | GMF | P value |
|---|---|---|---|
| Weight (kg) | | | |
| Day 8 | 2.33 ± 0.08 | 2.62 ± 0.08 | 0.022 |
| Day 21 | 5.68 ± 0.145 | 6.18 ± 0.129 | 0.024 |
| Average daily weight gain (g) | | | |
| Day 1-8 | 116.43 ± 9.08 | 149.39 ± 10.62 | 0.041 |
| Day 1-21 | 197.86 ± 6.66 | 221.56 ± 5.54 | 0.019 |

2.1.2 Effect of GMF on IgG Concentration in Piglet Plasma

As can be seen in Table 4, the IgG concentration in piglet plasma on day 21 was significantly increased after GMF feeding (p<0.05), while other parameters such as Glu, IgA, IGM, TG, HDL-c and LDL-c were not different. Butyrophilin (BTN), mucin (MUC), xanthine oxidoreductase (XOR), lactadherin (MFG-E8) and fatty acid binding protein (FABP) have different biochemical properties. Previous studies have shown that GMF supplementation in formula has growth-promoting effects on neonatal health and intestinal maturation in infants and animals, as indicated by the elevated plasma IgG levels in the present study.

TABLE 4

Effect of MFGM and LF on piglet plasma on day 21

| | CON | GMF | P value |
|---|---|---|---|
| GLU (mmol/L) | 7.33 ± 0.46 | 6.36 ± 0.07 | 0.128 |
| IgA (g/L) | 0.85 ± 0.06 | 0.92 ± 0.05 | 0.379 |
| IgG (g/L) | 7.08 ± 0.34 | 9.20 ± 0.30 | 0.001 |
| IgM (g/L) | 1.02 ± 0.06 | 0.90 ± 0.09 | 0.257 |
| TG (mmol/L) | 1.18 ± 0.08 | 1.11 ± 0.11 | 0.658 |
| HDL-C (mmol/L) | 1.37 ± 0.12 | 1.39 ± 0.08 | 0.910 |
| LDL-C (mmol/L) | 2.08 ± 0.09 | 2.20 ± 0.21 | 0.650 |

2.1.3 Effects of GMF on Intestinal Morphological Tract Development of Piglets

To determine the intestinal morphological development of the piglets, the villus height and crypt depth of the piglets were determined (Table 5). The results showed that the villus height of the duodenum and ileum of those in the GMF group could be significantly increased, while the depth of duodenal crypts was reduced (p<0.05).

TABLE 5

Effect of MFGM on piglet intestinal microecology on day 21

| | CON | GMF | P value |
|---|---|---|---|
| Villus height (μm) | | | |
| Duodenum | 416.70 ± 18.09 | 480.45 ± 19.20 | 0.042 |
| Jejunum | 423.50 ± 22.58 | 399.00 ± 18.86 | 0.429 |
| Ileum | 342.78 ± 33.80 | 444.68 ± 19.04 | 0.030 |
| Crypt depth (μm) | | | |
| Duodenum | 184.92 ± 13.69 | 112.93 ± 5.35 | 0.001 |
| Jejunum | 135.43 ± 10.27 | 107.07 ± 9.71 | 0.080 |
| Ileum | 102.95 ± 5.78 | 111.33 ± 9.30 | 0.466 |
| Villus height/crypt depth | | | |
| Duodenum | 2.32 ± 0.24 | 4.63 ± 0.52 | 0.004 |
| Jejunum | 3.21 ± 0.31 | 3.62 ± 0.25 | 0.336 |
| Ileum | 3.71 ± 0.52 | 4.47 ± 0.52 | 0.332 |

2.2 Effects of GMF on Intestinal Flora of Piglets

In order to study the differences of early microflora between CON and GMF piglets, 16S rRNA high-throughput sequencing technology was used to evaluate their microbial diversity, composition and differences.

2.2.1 Flora Composition of Piglets

The fecal flora of piglets on day 8 is shown in FIG. 1. The α-diversity index analysis showed that the diversity (Sobs) index of the GMF group decreased significantly (P<0.05) (FIG. 1A), while the Shannon index did not change (FIG. 1B). The β-diversity, PCoA analysis showed significant differences between CON group and GMF group (FIG. 1C). From the perspective of flora composition, the differential flora of piglets showed that GMF could significantly enrich *Lactobacillus* and reduce unclassified bacteria (P<0.05) (FIG. 1D). Linear discriminant analysis effect size (LEfSe) analysis also confirmed a significant increase in *Lactobacillus* in piglets in the GMF group (FIG. 1E).

The fecal flora of piglets on day 21 is shown in FIG. 2. For α-diversity, FIG. 2A and FIG. 2B showed that the diversity (Sobs) index and Shannon index of the GMF group increased significantly. For β-diversity, PCoA analysis showed that the CON group was significantly different from the GMF groups (FIG. 2C). The flora differences were shown at the genus level (FIG. 2D) the *Bacteroides, Enterococcus, Christensenella,* and *Robusia* showed an increasing trend, while members of the genus *Eubacterium* showed a decrease trend. The linear discriminant analysis effect size (LEfSe) analysis showed (FIG. 2E) a significant upward trend in the GMF group for *Bacteroides, Enterococcus, Robustia,* g_ruminant_UCG-002, g_Christensen_R-7_group, g_Marvinburi Antiaceae, g_CHKCI001 and unclassified bacteria.

2.2.2 Flora Functions of Piglets

Figure 1A:
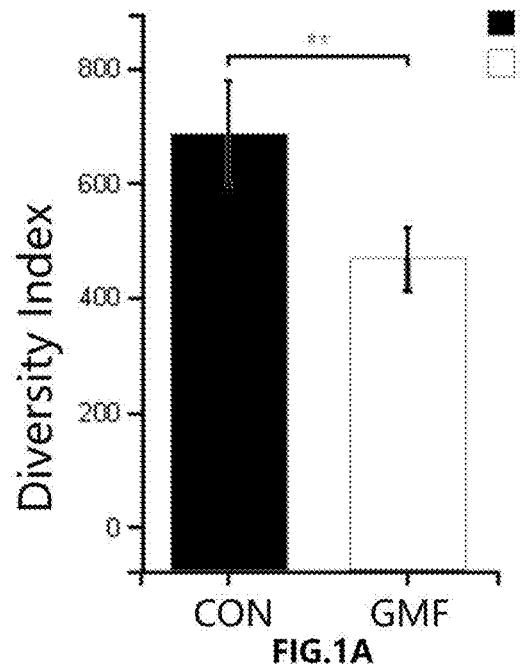
FIGS. 1A-1E show the composition of the fecal flora of the newborn piglet on the eighth day of Example 1 of the present disclosure.
Figure 1B:
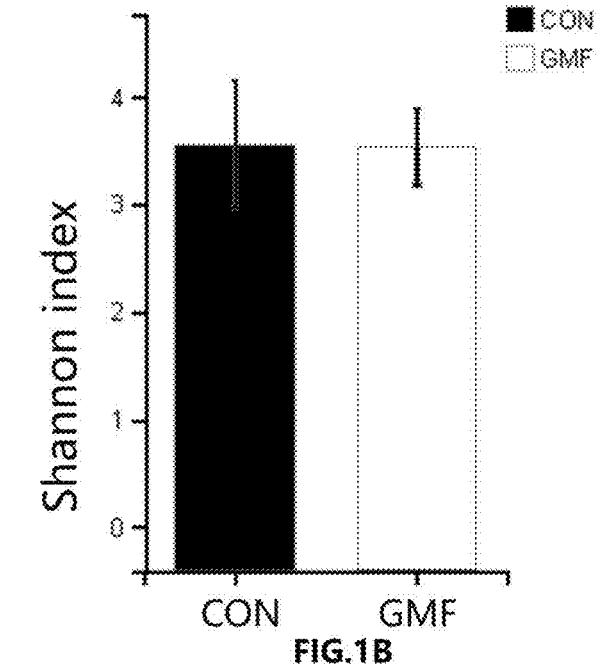
Figure 1C:
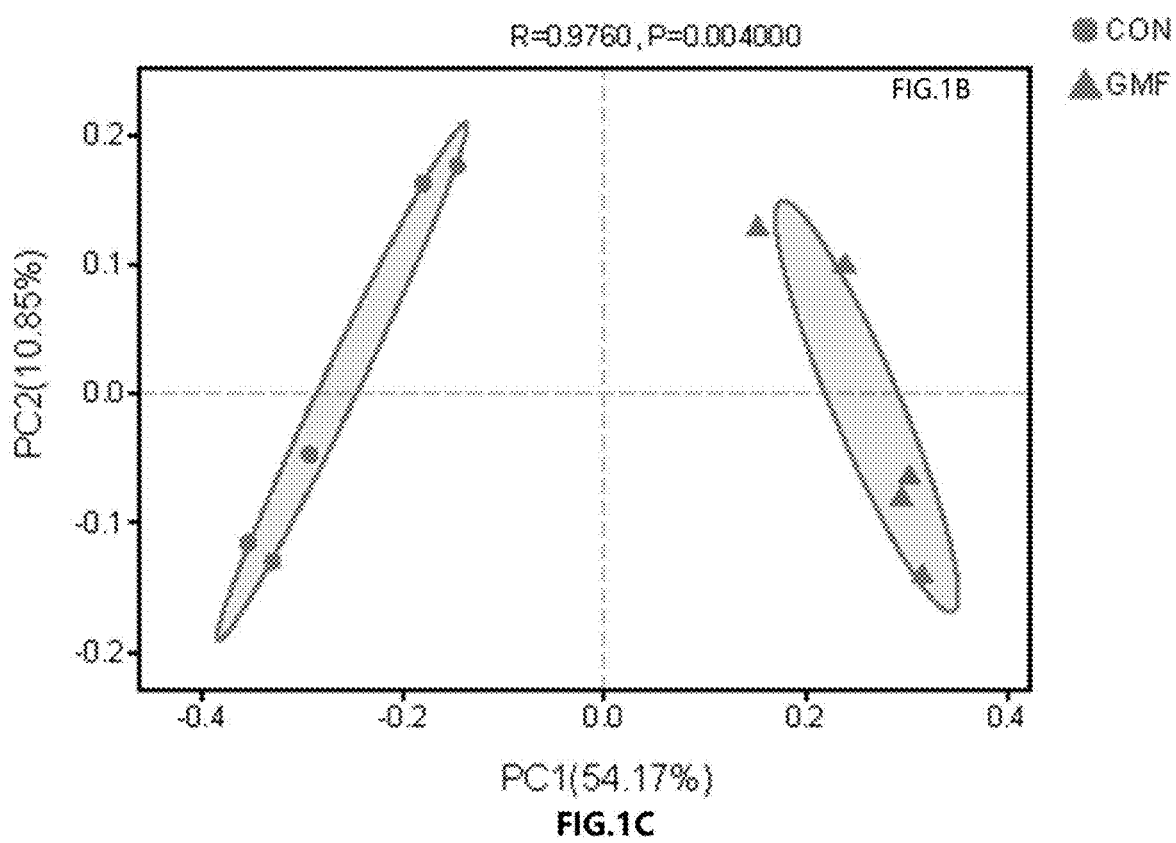
Figure 1D:
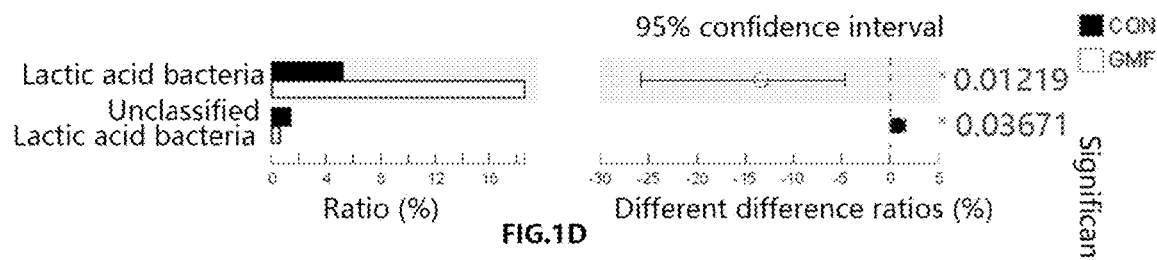
Figure 1E:
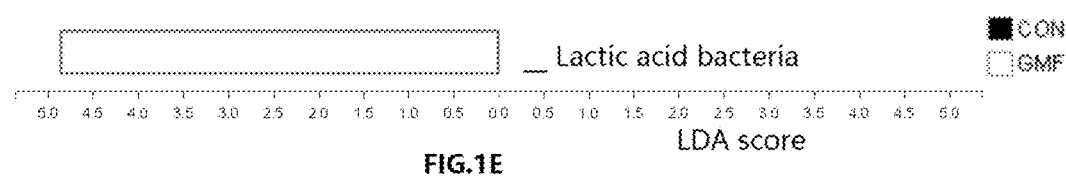
Figure 2A:
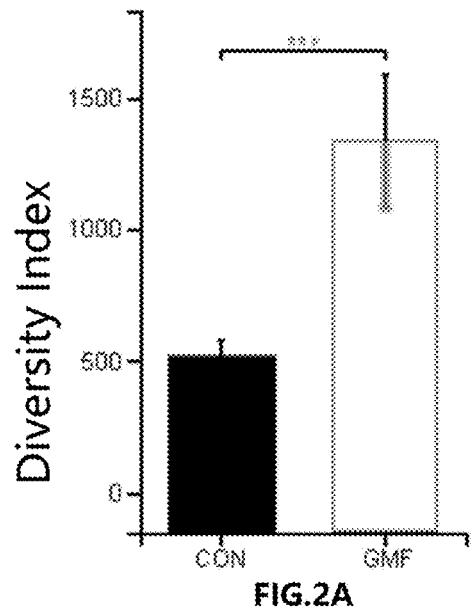
FIGS. 2A-2E show the composition of the fecal flora of the newborn piglet on the twenty-first day of Example 1 of the present disclosure.
Figure 2B:
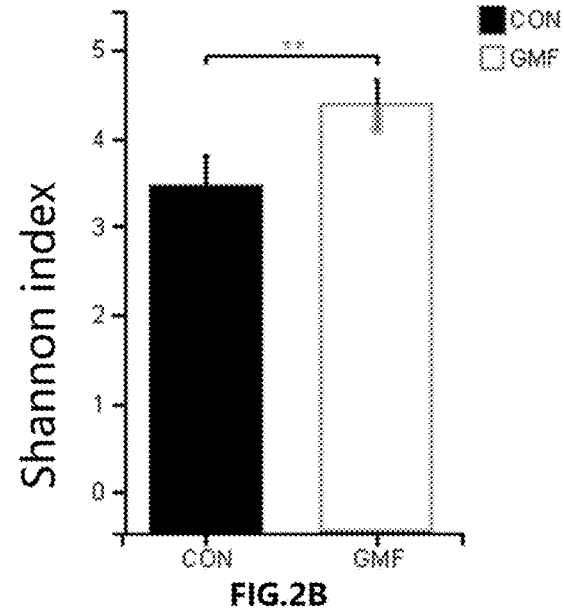
Figure 2C:
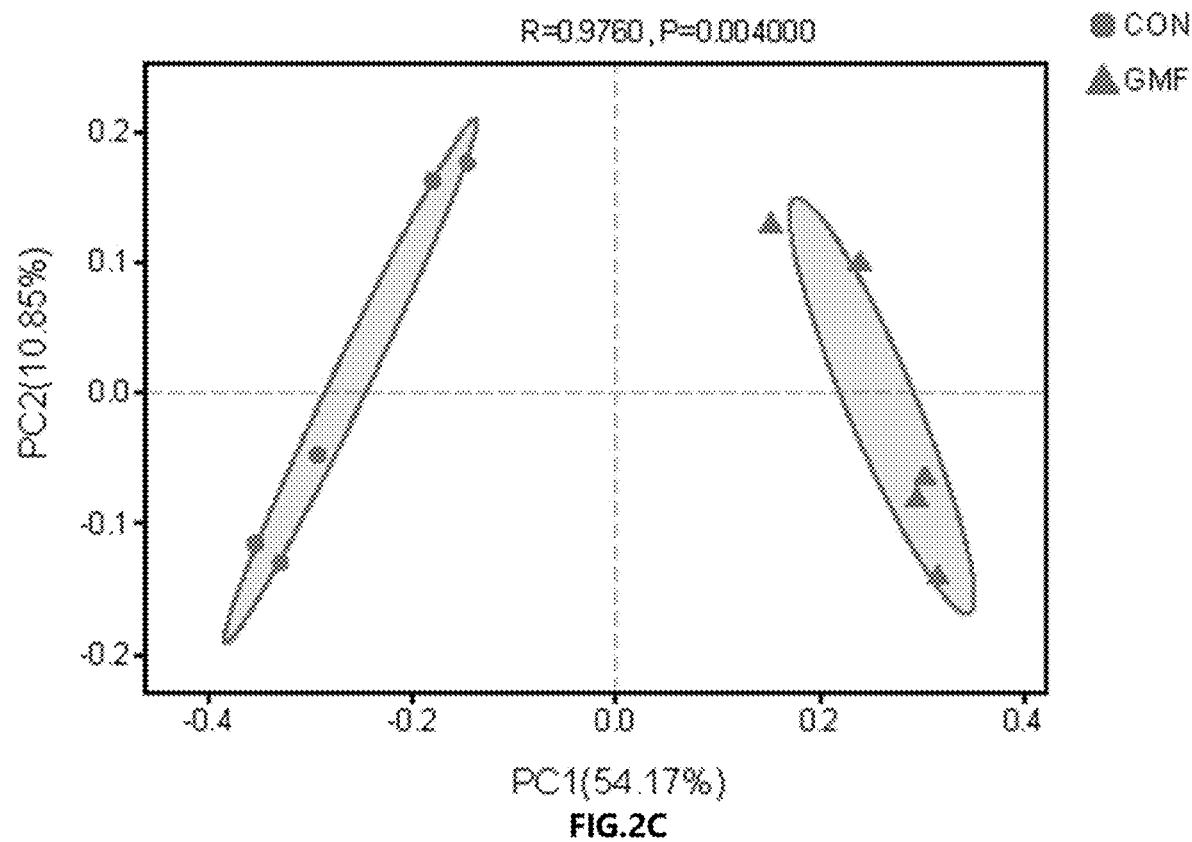
Figure 2D:
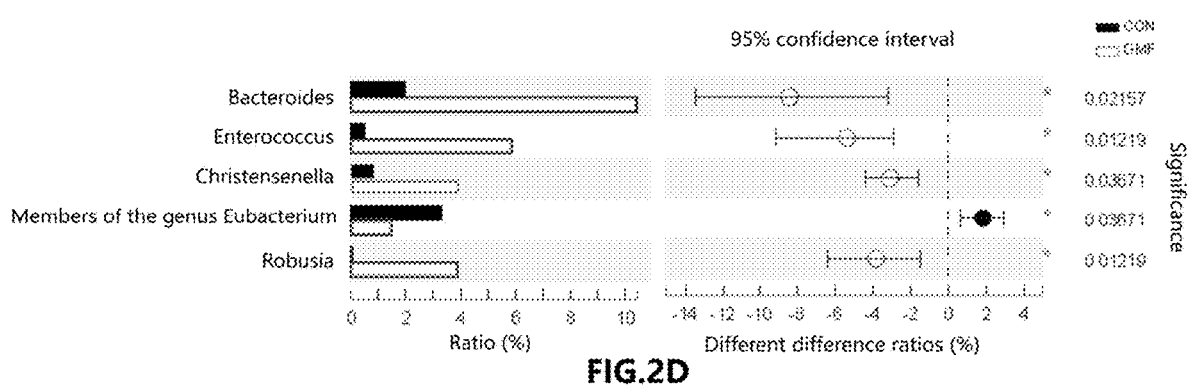
Figure 2E:
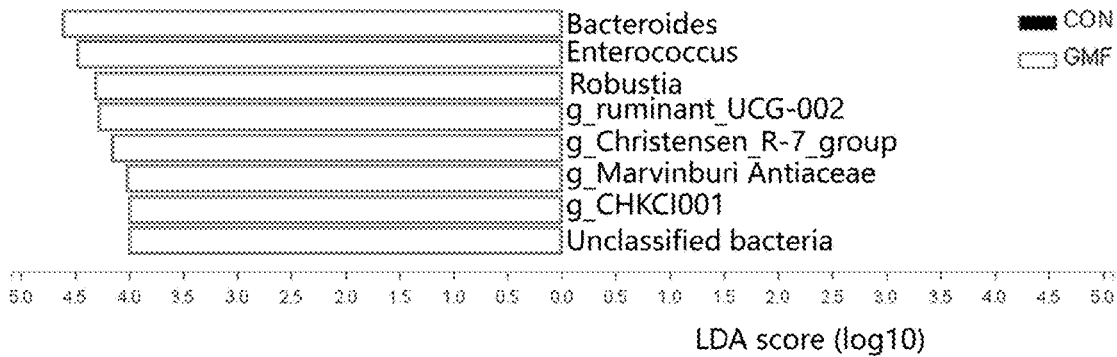
Figure 3A:
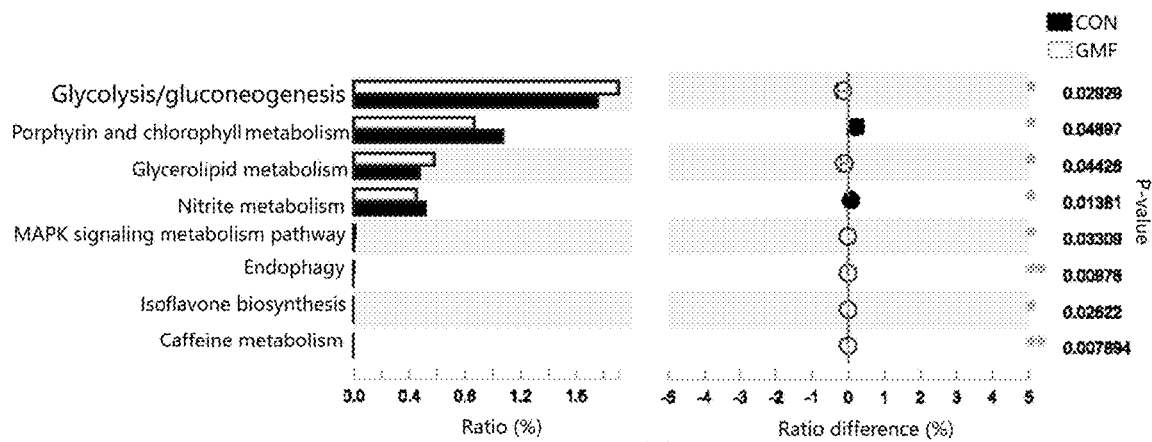
FIGS. 3A and 3B show the functional status of the intestinal flora of the newborn piglet of Example 1 of the present disclosure.
Figure 3B:
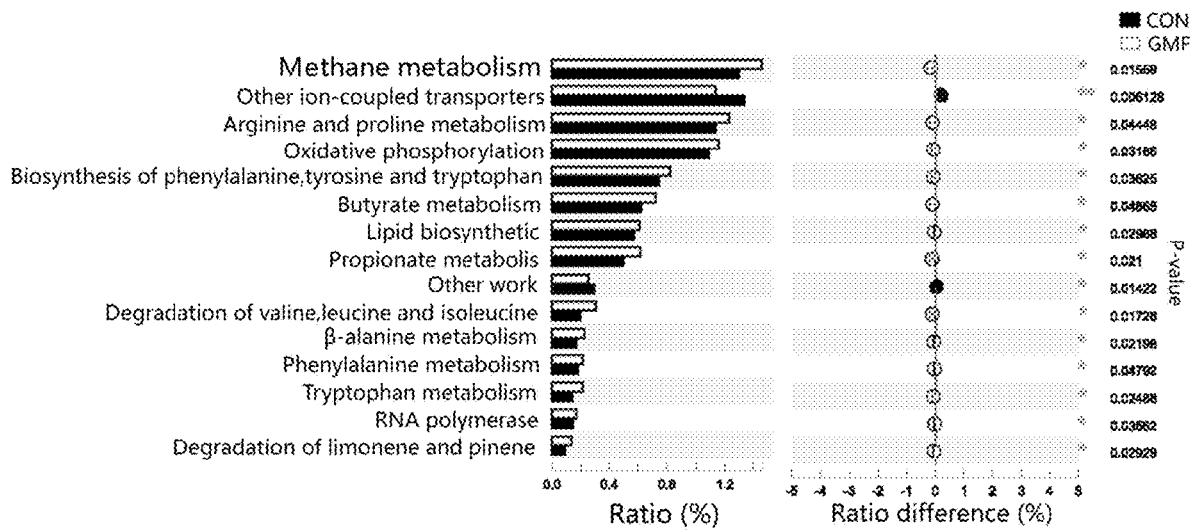

To further explore the functional profile of bacterial communities, we performed a phylogenetic study of the communities through PICRUSt using the KEGG database. As shown in FIG. 3A, on day 8, GMF increased glycolysis/gluconeogenesis, glycerolipid metabolism, MAPK signaling pathway, endophagy, flavonoid biosynthesis, and caffeine metabolism significantly, while genes related to porphyrin and chlorophyll metabolism and nitrogen metabolism were decreased. As shown in FIG. 3B, on day 21, GMF intervention significantly enriched methane metabolism, arginine and proline metabolism, oxidative phosphorylation, biosynthesis of phenylalanine, tyrosine and tryptophan, butyrate metabolism, lipid biosynthetic proteins, propionate metabolism, degradation of valine, leucine and isoleucine, β-alanine metabolism, phenylalanine metabolism, tryptophan metabolism, RNA polymerase, degradation of limonene and pinene, but genes linked to other ion-coupled transporters and other transporters decreased.

2.3 Effects of GMF on Intestinal Functions of Piglets

2.3.1 Intestinal Barrier Functions of Piglets

To clarify intestinal barrier function and intestinal permeability, the expression of intestinal barrier-related genes in mucosa (ileum and colon) and plasma DAO levels were detected. Ileal tight junction proteins (E-Cadherin, ZO-1) (FIG. 4A), mucins (mucin-1, mucin-2, mucin-4) (FIG. 4B), IL-22 (FIG. 4C) gene expression was significantly increased in the GMF group (P<0.05). Similarly, the gene expression of tight junction proteins (Occludin expression, connexin-1 and ZO-1) (FIG. 4D), mucin-20 (FIG. 4E) and cytokines (TNF-α and IL-1β) (FIG. 4F) was significantly elevated in the GMF group (P<0.05). Plasma DAO levels were significantly decreased in the GMF group (P<0.05) (FIG. 4G).

2.3.2 Concentration of SCFAs and Receptor Gene Expression in Feces of Piglets Concentrations of SCFAs in piglet feces and their receptor gene expression in the intestinal tract. The results showed that the concentrations of acetate, propionate and butyrate in the GMF group were all significantly higher than those in the CON group (p<0.05) (FIG. 5A). Furthermore, the gene expression of GPR41 in the colonic mucosa (FIG. 5B) in the GMF group increased. The increased short-chain fatty acid concentration and receptor thereof (GPR41) in the GMF group promoted propionic acid metabolism, regulated probiotic colonization and short-chain fatty acid metabolism, and finally activated enterocytes and enhanced intestinal barrier function.

In summary, the piglet model experiments showed that oral administration of GMF (galactooligosaccharides, α-lactalbumin powder, MFGM protein whey powder and polyfructoses) in piglets could significantly improve growth performance and reduce plasma IgG levels. The probiotic colonization (*Lactobacillus, Enterococcus* and *Robusia*) produced one week after birth promoted the production of short-chain fatty acids, and enhanced intestinal barrier function by increasing the expression of genes tight junctions (Occludin protein and ZO-1), mucins (Mucin-2 and Mucin-4) and cytokines (IL-1β and IL-22), thus improving piglet growth performance throughout the neonatal period. Our findings suggest that galactooligosaccharides, α-lactalbumin powder, milk fat globule membrane protein and polyfructose play very important roles in regulating the intestinal microbiome in early infancy.

Finally, it should be noted that: the above embodiments are only used to illustrate the technical solutions of this disclosure, but not to limit thereto. Although this disclosure has been described in detail with reference to the foregoing embodiments, those of ordinary skill in the art should understand modifications made to the technical solutions described in the foregoing embodiments, or equivalent replacements of some technical features thereof are possible, without making the essence of the corresponding technical solutions depart from the spirit and scope of the technical solutions of the embodiments of this disclosure.

INDUSTRIAL APPLICABILITY

The infant formula milk powder rich in milk fat globule membrane protein, phospholipids and oligosaccharides of this disclosure is prepared by: using raw cow milk as raw material, added with MFGM-rich whey protein powder, α-lactalbumin powder, galactooligosaccharides and polyfructoses, contents of biologically active substances with special functional ingredients such as MFGM-protein, lactoferrin (LF), α-lactalbumin (α-La), and the like are increased through formula adjustment, so as to promote the colonization of probiotics in the intestinal flora of infants, especially to significantly enrich the lactic acid bacteria in the intestinal tract, while reducing the unclassified bacteria and other miscellaneous bacteria, thereby increasing the content of immune factors in the intestinal tract and reducing the incidence of intestinal diseases. The formula is suitable for the development of formula milk powder for infants and older infants.

The invention claimed is:

1. An infant formula milk powder rich in milk fat globule membrane protein, phospholipids and oligosaccharides, prepared by using raw cow milk as raw material, added with milk fat globule membrane (MFGM)-rich whey protein powder, α-lactalbumin powder, galactooligosaccharides and polyfructoses; wherein contents of functional active ingredients per 100 grams of the infant formula milk powder are: 0.146-0.438 g total MFGM-protein, 0.22-0.35 g total α-lactalbumin, 0.2-0.6 g total lactoferrin, 0.1-0.3 g immunoglobulin IgG, 0.025-0.075 g lactadherin, 0.035-0.105 g Mucin short variant S1 (MUC1/Mucin1), 0.015-0.4 g total galactooligosaccharides, 0.001-0.003 g total polyfructoses, 0.05-0.15 g sialic acid, 0.175-0.525 g total phospholipid, 0.04-0.12 g sphingomyelin, 0.005-0.015 g ganglioside, 0.06-0.19 g lecithin, 0.04-0.14 g phosphatidylethanolamine, 0.02-0.06 g phosphatidylinositol, 0.007-0.021 g phosphatidylserine, 0.0174-0.0371 g diglyceride, and 0.0311-0.0598 g triglyceride.

2. The infant formula milk powder according to claim 1, wherein the contents of functional active ingredients per 100 grams of the infant formula milk powder are: 0.438 g total MFGM-protein, 0.35 g total a-lactalbumin, 0.35 g total lactoferrin, 0.172 g immunoglobulin IgG, 0.075 g lactadherin, 0.105 g MUC1/Mucin1, 0.4 g total galactooligosaccharide, 0.003 g total polyfructose, 0.15 g sialic acid, 0.525 g total phospholipid, 0.12 g sphingomyelin, 0.015 g ganglioside, 0.19 g lecithin, 0.14 g phosphatidylethanolamine, 0.06 g phosphatidylinositol, 0.021 g phosphatidylserine, 0.0371 g diglyceride, and 0.0598 g triglyceride.

3. The infant formula milk powder according to claim 1, wherein a bovine colostrum is added, which the bovine colostrum is made into 15-16 kilograms of bovine colostrum powder from 100 L fresh milk.

4. The infant formula milk powder according to claim 1, wherein 60 kg of the MFGM whey protein powder, 10 kg of the α-lactalbumin powder, 106 kg of the galactooligosaccharides, and 4.33 kg of the polyfructoses are added into per 2000 L raw cow milk.

5. The infant formula milk powder according to claim 1, wherein the infant formula milk powder is prepared by: using raw cow milk as raw material, cleaning and pre-sterilizing raw cow milk at 85° C.-88° C. for 30s, adding MFGM-rich whey protein powder, α-lactalbumin powder, galactooligosaccharides, polyfructoses and other ingredients into the pre-sterilized raw cow milk, and performing pre-sterilization at 85° C.-88° C. for 30 s, homogenization at 15 mPa, sterilization at 93° C.-95° C. for 15 s, concentration, and spray drying with an inlet air temperature of 150° C.-160° C., and an outlet air temperature of 85° C.-90° C.

6. A method for preparing the infant formula milk powder according to claim 1, comprising: using raw cow milk as raw material, cleaning and pre-sterilizing raw cow milk, adding MFGM whey protein powder, α-lactalbumin powder, galactooligosaccharides, polyfructoses and other ingredients into the pre-sterilized raw cow milk, and performing pre-sterilization, homogenization, sterilization, concentration, and spray drying.

7. The method for preparing the infant formula milk powder according to claim 6, wherein the pre-sterilizing is performed at 85° C.-88° C. for 30 s, the homogenization is performed at 15 mPa, the sterilization is performed at 93° C.-95° C. for 15s, and the spray drying is performed at an inlet air temperature of 150° C.-160° C., and an outlet air temperature of 85° C.-90° C.

8. A method for promoting the enrichment of probiotics in the intestinal tract of an infant or for promoting the immunity of an infant, comprising administration of the infant formula milk powder according to claim 1 to the infant.

* * * * *